UNITED STATES PATENT OFFICE.

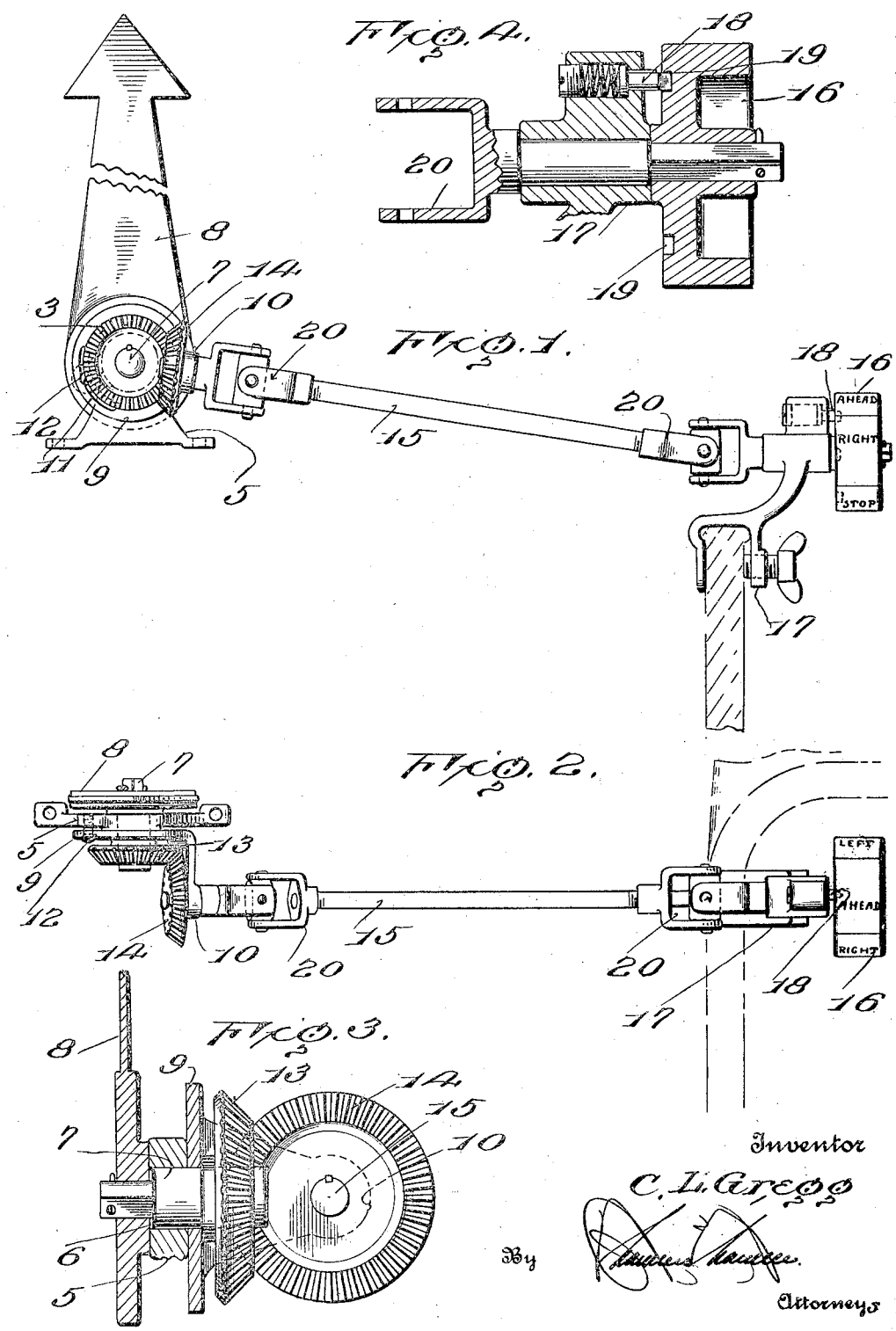

CHARLES L. GREGG, OF CHITTENANGO, NEW YORK.

AUTOMOBILE-SIGNAL.

1,359,697.      Specification of Letters Patent.      Patented Nov. 23, 1920.

Application filed June 17, 1919. Serial No. 304,746.

*To all whom it may concern:*

Be it known that I, CHARLES L. GREGG, a citizen of the United States, residing at Chittenango, in the county of Madison, State of New York, have invented certain new and useful Improvements in Automobile-Signals; and I do hereby declare the following to be a full, clear, and exact description of the invention, such as will enable others skilled in the art to which it appertains to make and use the same.

This invention relates to indicators, and more particularly to traffic indicators for automobiles, and has for its object to provide a device which may be attached to an automobile and by means of which the driver of the vehicle may indicate to others the intended operation of his vehicle.

Another object is to provide a device which will be extremely simple in construction and thus cheap to produce. It is a further object to provide a device so made as to be adjustable in a way to facilitate its mounting upon different automobiles in various positions.

In the drawings:

Figure 1 is an elevational view of the complete invention.

Fig. 2 is an elevational view of the indicator and its mountings with the indicator gear removed.

Fig. 3 is a vertical section taken centrally through Fig. 2 looking in the direction of the shaft gear, with the indicator gear in place.

Fig. 4 is a section through the controlling knob and its mountings.

Referring now to the drawings, the present invention comprises an indicator bracket 5, adapted to be secured to the top of an automobile, to one of the fenders, or in any other suitable position so that it may be seen both from the front and the rear of the machine. This bracket has a horizontal passage 6 formed therethrough, in which there is journaled an indicator shaft 7, carrying at one end an indicating arm 8 illustrated as being in the form of an arrow. The indicating arm extends laterally beyond the shaft 7 outwardly of the passage 6 so as to act as a stop to prevent withdrawal of the shaft 7 from the bracket.

Engaged with the shaft 7 at the opposite side of the bracket from the indicator 8 there is an adjustable plate 9, carrying a shaft bearing 10, this plate being adapted to be swung upon the shaft 7 as a pivot. Formed through the plate there is an arcuate slot 11 concentric with the shaft, and engaged through this slot and threaded into the bracket 5 there is a fastening screw 12.

Engaged with the shaft 7 outwardly of the plate 9 there is a beveled gear 13, and meshing with this beveled gear there is a similar gear 14 carried by a shaft 15 journaled in the bracket 10. By reason of the fact that the plate 9 is shiftable about the shaft 7, the part may be adjusted so as to cause the shaft 15 to extend laterally from the shaft 7 in any desired direction.

With the opposite end of the shaft 15, there is connected a hand knob 16 for the control of the indicator. This knob, at points spaced 90° from each other is marked with suitable indicia, designating the signal conveyed by the indicator 8 in position corresponding to the various positions of the knob 16. These indicia may be the words "Right", "Left", "Ahead" and "Stop". An attaching bracket 17 is provided, through which the shaft 15 is engaged adjacent to the hand knob. This bracket carries a spring detent pin 18 located for engagement in a series of depressions 19 formed in the adjacent face of the knob so that rotation of the knob may be arrested as the indicator 8 reaches each of its indicating points.

It is to be understood that when the indicator extends upwardly it signifies to traffic that it is the intention of the driver of the vehicle to continue straight ahead. When it is turned to the right, it indicates a right hand turn and it indicates a left hand turn when turned to the left. When directed downwardly it indicates an intended stop.

One or more universal joints 20 are included in the shaft 15 to facilitate the proper installation of the device and the provision of these joints together with the provision of the adjustable mounting for the shaft upon the bracket 5 makes possible the accommodation of the device to vehicles of various proportions.

What is claimed is:

1. An indicator for automobiles comprising a bracket, a shaft journaled in the bracket, an indicating arm carried by one end of the shaft, a plate engaged upon the shaft at the opposite side of the bracket from the indicator arm and shiftable about the shaft on a pivot, means for holding the plate at different points of its movement with respect to the bracket, a bearing carried by the plate, an operating shaft journaled in the bearing, and intermeshing beveled gears carried by the indicator arm shaft and the second mentioned shaft, respectively.

2. A shiftable direction indicator comprising a bracket having a bearing therein and a parallel threaded perforation concentric with the bearing, an indicator shaft journaled in the bearing and provided at opposite ends with an indicator arm and a beveled gear, respectively, an angular plate pivotally mounted at one end upon the shaft between the gear and bracket and having an arcuate slot concentric with the shaft, a clamping screw engaged through the slot and into the perforation of the bracket and adapted to impinge against the plate and hold it against pivotal movement, a second shaft journaled in the other end of the angular plate and at right angles to the first named shaft, and a beveled gear carried by the second shaft and meshing with the first named gear.

In testimony whereof, I affix my signature, in the presence of two witnesses.

CHARLES L. GREGG.

Witnesses:
   CHAS. B. WARD,
   EDWARD R. CARPENTER.